PREPARATION OF HIGH PURITY MAGNESIUM OXIDE FROM MAGNESIUM SALT SOLUTIONS

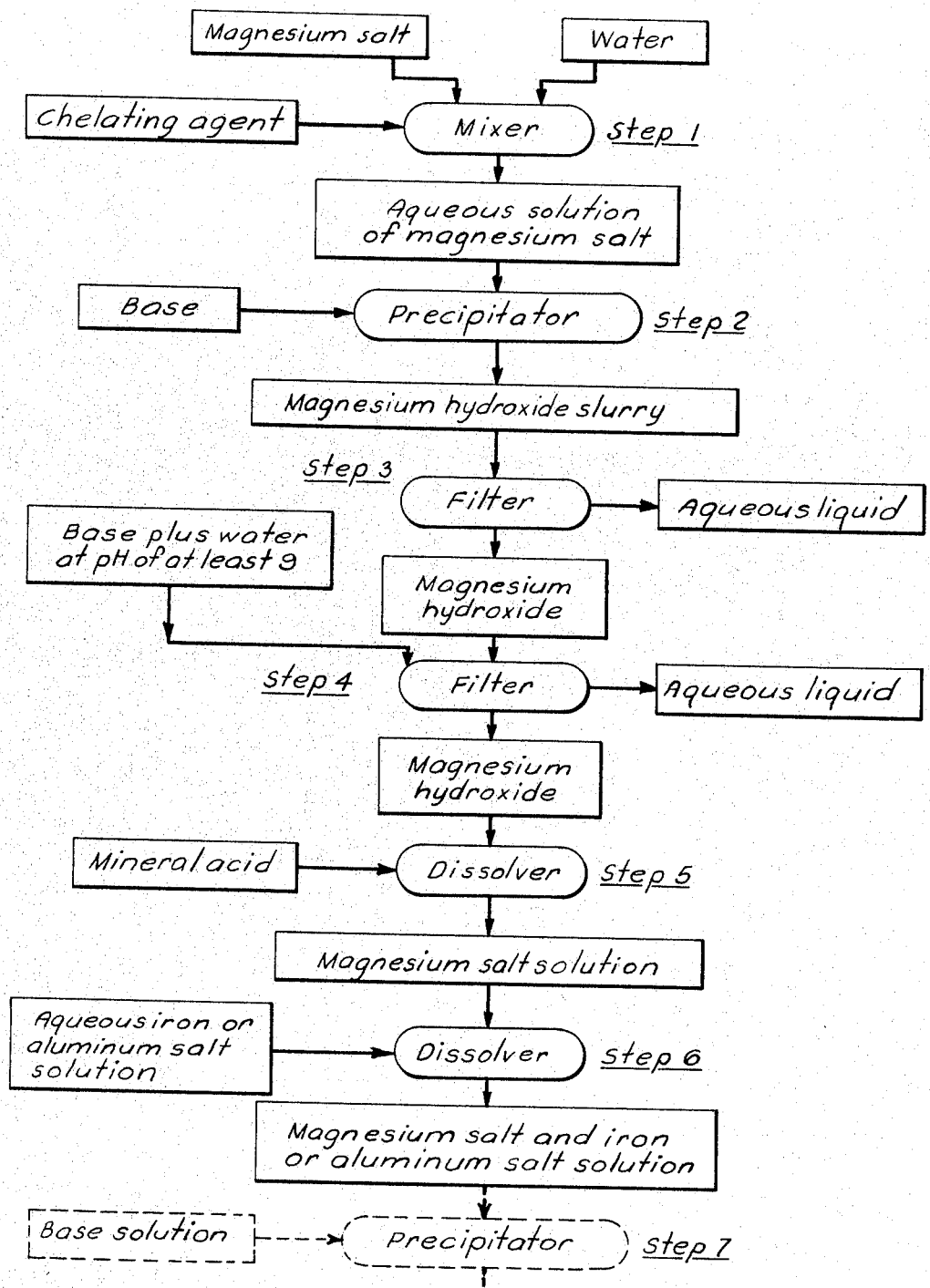

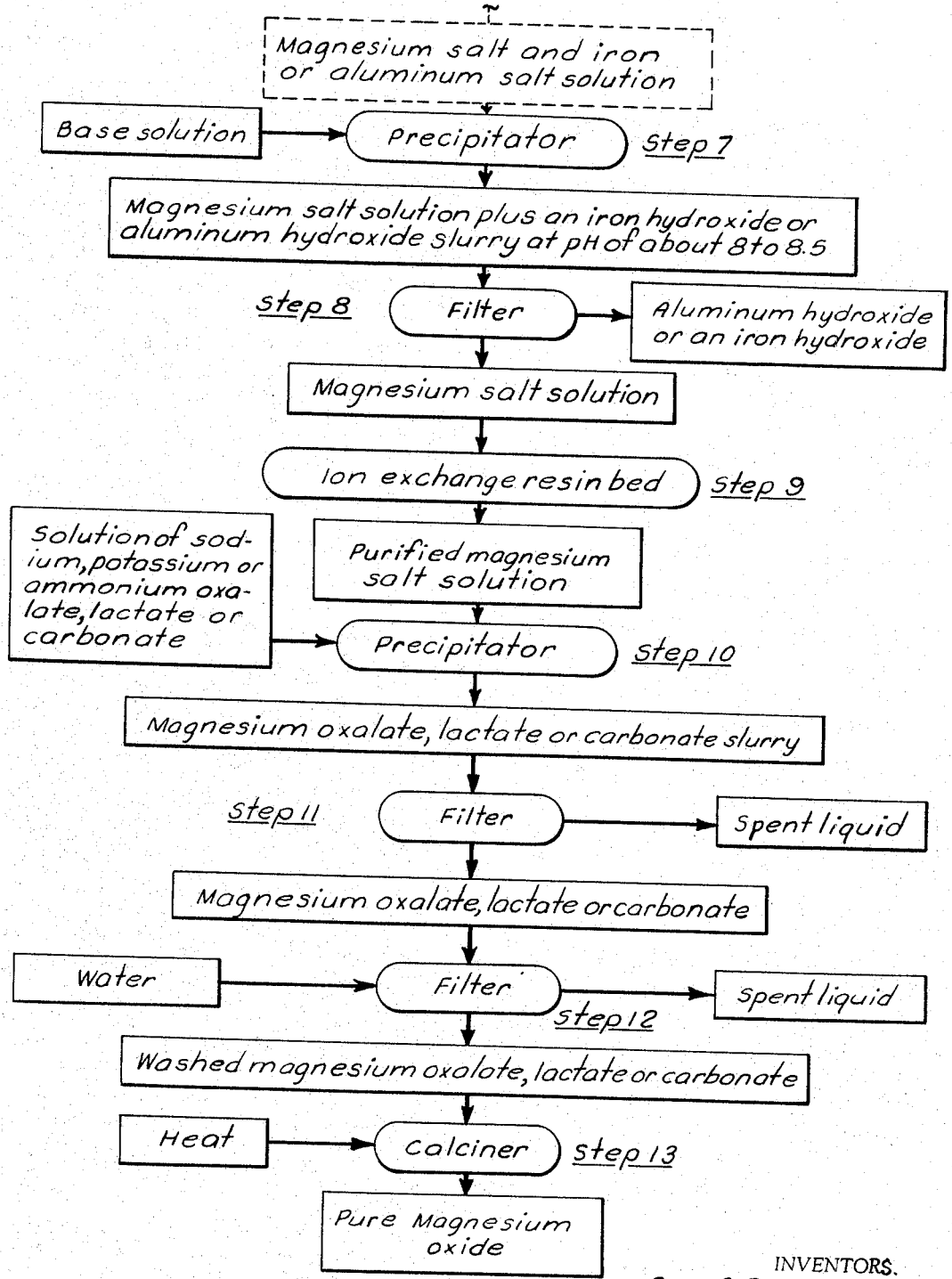

Gary A. Bornemann and William F. McIlhenny, Lake Jackson, Tex., assignors to The Dow Chemical Company, Midland, Mich., a corporation of Delaware
Filed Nov. 4, 1963, Ser. No. 321,130
9 Claims. (Cl. 23—201)

This invention relates to a method for preparing magnesium oxide and, more particularly, is concerned with the manufacture of a very high purity magnesium oxide.

Presently, commercially available magnesium oxide in the form of a finely divided, non-sintered, free-flowing, coarse, granular powder contains impurities which produce slight discoloration and lower the melting point of the product. Thus, when such magnesium oxide is employed as an electrical insulator, difficulty is encountered at high temperatures due to these impurities. The presence of boron and beryllium as impurities in the magnesium oxide particularly attributes to this loss of insulating properties and early failure of the supposedly insulated electrical components.

The Atomic Energy Commission has required a high purity magnesium oxide to use as a ware material for the casting or molding of metals to be used in nuclear applications. The purest magnesium oxide heretofore available for these purposes has been an analytical reagent grade of less than 99.97 percent purity MgO.

The magnesium oxide product produced by the process of this invention is 99.99 percent pure MgO and when calcined does not sinter to yield a coarse, granular powder, but rather yields a very finely divided, free-flowing powder. The finely divided, high purity magnesium oxide powder of this invention can be subsequently fused to yield products or ware that are devoid of the faults which accompany such products when prepared from the known commercially available lower purity magnesium oxides. In addition, the finely divided, free-flowing product of this invention may be employed as a pigment or filler in various coatings or molding formulations and as a starting material for preparing other pure magnesium compounds.

Thus it is an object of the instant invention to provide a novel method of preparing high purity magnesium oxide, i.e., 99.99 percent MgO.

An additional object is to provide a method of preparing extremely pure magnesium oxide which may be used as an electrical insulator at high temperatures without producing the harmful effects which accompany the use of known commercial grades of magnesium oxide.

A further object is to provide a method of preparing high purity magnesium oxide which is within the purity limits required by the Atomic Energy Commission.

These and other objects and advantages of this invention will be made apparent from the following detailed description thereof and the accompanying figure which is a schematic drawing of the steps which comprise the method of the instant invention.

In general, the method of the instant invention for preparing a high purity magnesium oxide comprises dissolving a solid magnesium salt (e.g., magnesium chloride) in water and adding a chelating agent (i.e., a calcium ion sequestering agent such as any salt of ethylenediamine tetracetic acid) thereto. An alkali metal hydroxide (e.g., sodium hydroxide or potassium hydroxide) or ammonium hydroxide is added to the solution thereby precipitating out magnesium hydroxide. The spent aqueous portion is filtered out and the precipitate is washed. If desired this then may be refiltered. The magnesium hydroxide thus obtained is further purified by dissolving it in a mineral acid (e.g., hydrochloric, nitric or sulfuric acids), adding a soluble aluminum or iron salt (e.g., aluminum chloride, aluminum nitrate, aluminum sulfate or iron chloride, iron nitrate or iron sulfate) to said acid mixture and adding a base (e.g., sodium hydroxide, potassium hydroxide or ammonium hydroxide) thereby precipitating out aluminum hydroxide (or iron hydroxide). The insolubles are filtered out and the filtrate is passed through a cation exchange resin bed. A compound selected from the group consisting of sodium, potassium or ammonium oxalates, lactates or carbonates is added to the filtrate thereby precipitating out magnesium oxalate, lactate or carbonate. The latter magnesium compound is filtered out, washed and calcined to get the high purity magnesium oxide.

In carrying out one variation of the method of the instant invention referring to the accompanying figure, magnesium chloride is dissolved in water to form a solution within the range of from about 0.1 to 35 percent by weight magnesium oxide at 25° C., and preferably from about 30 to about 34 percent. A calcium ion sequestering agent, namely, Versene 100 (which consists of an aqueous solution of tetrasodium ethylenedinitrilotetraacetate), Versenex 80 (which consists of an aqueous solution of the penta sodium salt of diethylene triamine pentaacetic acid) or any ammonium or alkali metal salt of ethylenediamine tetracetic acid or diethylene triamine pentaacetic acid (e.g., the sodium or potassium salts) is added in a ratio to the weight of magnesium chloride in solution within the range from about 0.001 to about 1, the preferred ratio being about 0.01 to about 0.5, so as to completely remove substantially all of the calcium ions present in said solution, there being sufficient water in the mixture to insure complete solubilization of the $MgCl_2$ and the chelating agent. The temperature is not critical at this stage, but preferably is an ambient temperature in the range of from about 10° to 40° C. [At this point, an extra filtration step can be employed if insoluble impurities are present although this step is not usually required.] The second step is comprised of adding a base, preferably a solution of sodium hydroxide or potassium hydroxide of concentrations within the range of from about 5 to about 50 percent by weight of base, in order to raise the pH to a value within the range of from about 11.0 to 12.0, and preferably to about 11.5 thereby precipitating $Mg(OH)_2$. Aqueous reaction masses of lower pH are not as effective in removing the calcium ion impurity from the magnesium. Again, the temperature to be employed is not critical, however, normal ambient temperatures are preferred.

The magnesium hydroxide is removed from the aqueous phase (Step 3) ordinarily using either a batch-type or a continuous-type centrifuge or filter, the type of filter not being a critical matter. The magnesium hydroxide is washed with water that has been brought to a pH of at least 9.0 by adding alkali metal hydroxide to said water to assure removal of any calcium ions that may still cling to the magnesium hydroxide particles. The water used in this step and in all subsequent steps should be of high purity in order that the water itself does not contribute impurities to the desired products. Such purified water may be obtained by passing distilled water through ion exchange resins to substantially remove all impurities therefrom. The magnesium hydroxide is separated from the aqueous phase (Step 4) in a similar manner as previously described for Step 3. The washing and filtering steps (Steps 3 and 4) may be repeated one or more times if desired. The magnesium hydroxide is then dissolved in aqueous mineral acid, e.g., hydrochloric acid, (Step 5) of a concentration within the range from about 3 to 37 percent by weight HCl, the preferred being about 8 to 20 percent thus forming a solution of magnesium chloride. A solution of an aluminum salt or iron salt (i.e., one of those previously mentioned) having a concentration within the range from about 5 to about 60 percent by weight and preferably about 20 to 50 percent by weight of the solute is then added to the magnesium salt solution in amounts of 1 mole percent of the aluminum compound for each 400 p.p.m. manganese present and 10 mole percent of the iron compound for each 400 p.p.m. manganese present, and is dissolved therein (Step 6). A base, preferably a solution of sodium, potassium or ammonium hydroxide having a concentration within the range from about 5 to 50 percent by weight, and preferably about 20–40 percent is added to said mixture containing the magnesium hydroxide in order to raise the pH within the range from about 8.0 to about 9.0, preferably about 8.0 thereby precipitating aluminum hydroxide or iron hydroxide (Step 7). The iron hydroxide or aluminum hydroxide has a strong attraction for manganese and boron ions and substantially removes these ions from the magnesium ion containing solution. The insolubles created by Steps 6, 7 and 8 are removed, ordinarily by filtration (Step 8). The filtrate is then passed through an ion exchange resin bed (Step 9). The ion exchange resin can be any cation exchange resin that will attract iron or aluminum ions, in preference to magnesium ions, the amount of resin not being critical beyond the point of having enough capacity to attract substantially all of the iron or aluminum ions present. The resin may, for example, be a carboxylic-type resin or a sulfonic-type resin. A sodium, potassium or ammonium oxalate, lactate or carbonate solution having a weight concentration of said salt within the range from about 3 to 3.7 percent for sodium oxalate, 3 to 6 percent for ammonium oxalate, 3 to 35 percent for potassium oxalate, 3 to 33 percent for sodium carbonate, and 3 to 80 percent for all others respectively, is added to the filtrate in sufficient quantity to precipitate all the magnesium ions as magnesium oxalate, lactate or carbonate, respectively (Step 10). A mole ratio of sodium, potassium or ammonium oxalate, lactate or carbonate to magnesium hydroxide of 1/1 is required for optimum results. The magnesium oxalate, lactate or carbonate product is filtered out (Step 11) and washed with water. The filtering step is repeated (Step 12) and the product then calcined (Step 13) to obtain the extremely pure magnesium oxide of this invention. The calcining of the magnesium compound, i.e., the heating of the magnesium salt at sufficiently high temperatures and lengths of time to convert the magnesium salt to magnesium oxide, may be done in accordance with the known art. A minimum temperature of about 400° C. may be used.

Magnesium salts which can be used as feed materials in the method of the instant invention include magnesium chloride, magnesium bromide, magnesium iodide, magnesium nitrate, magnesium sulfate or any soluble magnesium salt that will form magnesium hydroxide when the pH of the solution is raised to 11.0 or more.

The following example is merely illustrative of the method of the instant invention and is in no way meant to limit it thereto.

EXAMPLE 3.45 liters of a 34 percent solution of magnesium chloride was mixed with 1.124 liters of 1.0 molar Versene 100 and 5.56 liters of purified water at ambient temperature. N/l. sodium hydroxide solution was added to the mixture until a pH of 11.5 was attained and magnesium hydroxide was thereby precipitated. The magnesium hydroxide was filtered out and washed with a combination of sodium hydroxide and purified water (said combination having a pH of 9) and was refiltered. The magnesium hydroxide thus obtained was dissolved in 1.48 liters of concentrated hydrochloric acid and diluted with 4.37 liters of purified water thus producing a magnesium chloride solution. A solution composed of 145.6 grams of ferric chloride ($FeCl_3$) dissolved in 400 milliliters of purified water was added to the magnesium chloride solution. N/l. sodium hydroxide solution was then added to the magnesium chloride solution whereupon at a pH of 8.3, ferric hydroxide was precipitated therefrom. The insoluble matter (silicates, ferric hydroxide, etc.) was removed by filtration and the filtrate was then passed through a column containing 114 cubic centimeters of a carboxylic resin cation exchanger, said exchanger having a one inch inside diameter and about a nine inch length. About 142 grams of ammonium oxalate dissolved in 2.5 liters of water was added to each liter of the effluent from the resin bed thereby precipitating out magnesium oxalate. The magnesium oxalate precipitate was separated out by filtration and washed with purified water. The wash liquor was then removed by filtration. The magnesium oxalate was calcined at 1000° C. for about 16 hours. A yield of essentially 80 percent of the magnesium initially present was recovered as magnesium oxide in the final product which was found, by spectroscopic analysis, to be more than 99.99 percent magnesium oxide. The product was a white, free-flowing, non-sintered, finely divided powder.

Various modifications can be made in the method of the present invention without departing from the spirit or scope thereof, for it is understood that we limit ourselves only as defined in the appended claims.

What is claimed is:

1. A method for the preparation of high purity magnesium oxide from a water-soluble magnesium salt comprising:
   (a) adding a calcium ion sequestering agent to an aqueous solution of a magnesium salt feed material;
   (b) adding an aqueous basic solution selected from the group consisting of aqueous alkali metal hydroxides and ammonium hydroxide to said mixture so as to raise the pH of said mixture to at least 11.0 thereby precipitating magnesium hydroxide;
   (c) separating said magnesium hydroxide from the residual aqueous liquor;
   (d) dissolving said magnesium hydroxide in an aqueous solution of a mineral acid thus forming a corresponding magnesium salt solution;
   (e) adding an aqueous solution of a soluble salt of a metal selected from the group consisting of iron and aluminum to the magnesium salt solution;
   (f) adding an aqueous basic solution selected from the group consisting of alkali metal hydroxides and ammonium hydroxide to said solution thereby raising the pH of said solution to at least 8 and not greater than about 9 thereby precipitating out said hydroxide of the metal salt;
   (g) removing the insolubles from said solution;
   (h) passing the substantially solid free solution through an ion exchange resin bed, said resin bed having a stronger affinity for aluminum and iron ions than for magnesium ions;
   (i) adding to said solution from said resin bed, a compound selected from the group consisting of sodium oxalate, potassium oxalate, ammonium oxalate, sodium lactate, potassium lactate, ammonium lactate, sodium carbonate, potassium carbonate, and ammonium carbonate, in an amount sufficient to precipitate from solution the corresponding magnesium salt;
   (j) separating said precipitated magnesium salt from said solution; and
   (k) calcining said magnesium salt thereby producing high purity magnesium oxide.

2. A method in accordance with claim 1 wherein the magnesium salt feed material is selected from the group consisting of magnesium chloride, magnesium bromide, magnesium iodide, magnesium nitrate and magnesium sulfate.

3. A method in accordance with claim 1 wherein the calcium ion sequestering agent is a material selected from the group consisting of alkali metal salts of ethylenediamine tetracetic acid and the ammonium salt of ethylenediamine tetracetic acid.

4. A method in accordance with claim 1 wherein the soluble salt of aluminum and iron is selected from the group consisting of aluminum chloride, aluminum nitrate, aluminum sulfate, iron chloride, iron nitrate and iron sulfate.

5. A method in accordance with claim 1 wherein the ion exchange resin contains a plurality of carboxyl sites.

6. A method in accordance with claim 1 wherein said mineral acid is a member selected from the group consisting of HCl, $H_2SO_4$ and $HNO_3$.

7. A method for the preparation of high purity magnesium oxide from magnesium chloride comprising:
  (a) adding a calcium ion sequestering agent to an aqueous solution of magnesium chloride containing from about 0.1 to about 35 percent by weight magnesium chloride so that said calcium ion sequestering agent is in a ratio to the weight of said magnesium chloride in solution within the range of from about 0.001 to about 1;
  (b) adding to said solution an aqueous basic solution selected from the group consisting of aqueous alkali metal hydroxides and ammonium hydroxide so as to raise the pH of said mixture to a value within the range of from about 11.0 to about 12.0 thereby precipitating magnesium hydroxide;
  (c) separating said precipitated magnesium hydroxide from the residual aqueous liquor;
  (d) dissolving said precipitated magnesium hydroxide in an aqueous solution of a mineral acid selected from the group consisting of hydrochloric, nitric and sulfuric acids, of a concentration within the range of from about 3 to about 37 percent by weight mineral acid thus forming a corresponding magnesium salt solution;
  (e) adding an aqueous solution having a concentration of about 5 to about 60 percent by weight of a soluble salt of a metal selected from the group consisting of iron and aluminum to said magnesium salt solution in amounts of at least 1 mole percent of said aluminum salt for each 400 p.p.m. manganese present and 10 mole percent of the iron salt for each 400 p.p.m. manganese present in said magnesium salt solution;
  (f) adding an aqueous basic solution selected from the group consisting of aqueous alkali metal hydroxides and ammonium hydroxide to said solution thereby raising the pH of said solution to a value within the range of from about 8 to about 9 thereby precipitating said hydroxide of the metal salt;
  (g) removing the insolubles from said solution;
  (h) passing the substantially solid free solution through an ion exchange resin bed, said resin bed having a stronger affinity for aluminum and iron ions than for magnesium ions;
  (i) adding to said solution from said resin bed, a compound selected from the group consisting of sodium oxalate, potassium oxalate, ammonium oxalate, sodium lactate, potassium lactate, ammonium lactate, sodium carbonate, potassium carbonate and ammonium carbonate, thereby precipitating from solution the corresponding magnesium salt;
  (j) separating said precipitated magnesium salt from said solution; and
  (k) calcining the magnesium salt at a temperature of at least 400° C. thereby producing high purity magnesium oxide.

8. A method for the preparation of high purity magnesium oxide from magnesium chloride comprising:
  (a) adding a calcium ion sequestering agent to an aqueous solution of magnesium chloride containing from about 30 to about 34 percent by weight magnesium chloride so that said calcium ion sequestering agent is in a ratio to the weight of said magnesium chloride in solution within the range of from about 0.01 to about 0.5;
  (b) adding to said solution an aqueous basic solution selected from the group consisting of aqueous alkali metal hydroxides and ammonium hydroxide so as to raise the pH of said mixture to a value of about 11.5, thereby precipitating magnesium hydroxide;
  (c) separating said precipitated magnesium hydroxide from the residual aqueous liquor;
  (d) dissolving said precipitated magnesium hydroxide in an aqueous solution of a mineral acid selected from the group consisting of hydrochloric, nitric and sulfuric acids, of a concentration within the range of from about 8 to about 20 percent by weight mineral acid thus forming a corresponding magnesium salt solution;
  (e) adding an aqueous solution having a concentration of about 20 to about 50 percent by weight of a soluble salt of a metal selected from the group consisting of iron and aluminum to said magnesium salt solution in amounts of at least 1 mole percent of said aluminum salt for each 400 p.p.m. manganese present and 10 mole percent of the iron salt for each 400 p.p.m. manganese present in said magnesium salt solution;
  (f) adding an aqueous basic solution selected from the group consisting of aqueous alkali metal hydroxides and ammonium hydroxide to said solution thereby raising the pH of said solution to a value of about 8, thereby precipitating said hydroxide of the metal salt;
  (g) removing the insolubles from said solution;
  (h) passing the substantially solid free solution through an ion exchange resin bed, said resin bed having a stronger affinity for aluminum and iron ions than for magnesium ions,
  (i) adding to said solution from said resin bed a compound selected from the group consisting of sodium oxalate, potassium oxalate, ammonium oxalate, sodium lactate, potassium lactate, ammonium lactate, sodium carbonate, potassium carbonate and ammonium carbonate, thereby precipitating from solution the corresponding magnesium salt;
  (j) separating said precipitated magnesium salt from said solution; and
  (k) calcining the magnesium salt at a temperature of at least 400° C. thereby producing high purity magnesium oxide.

9. A method for the preparation of high purity magnesium oxide from magnesium chloride comprising:
  (a) adding a calcium ion sequestering agent consisting of an aqueous solution of tetrasodium ethylenedinitrilotetraacetate to an aqueous solution of magnesium chloride containing about 34 percent by weight magnesium chloride so that said calcium ion sequestering agent is in a ratio to the weight of said magnesium chloride in solution within the range of from about 0.01 to about 0.5;
  (b) adding to said solution an aqueous solution of sodium hydroxide thereby raising the pH of said mixture to a value of about 11.5, thereby precipitating magnesium hydroxide;
  (c) separating said precipitated magnesium hydroxide from the residual aqueous liquor;
  (d) dissolving said precipitated magnesium hydroxide in an aqueous solution of hydrochloric acid thus forming a magnesium chloride solution;
  (e) adding an aqueous solution containing about 36 percent weight by volume of ferric chloride to said magnesium chloride solution in amounts of at least 10 mole percent for each 400 p.p.m. manganese present in said magnesium chloride solution;
  (f) adding to said solution an aqueous solution of sodium hydroxide thereby raising the pH of said solution to a value of about 8.3 thereby precipitating ferric hydroxide;
(g) removing the insolubles from said solution;
(h) passing the substantially solids free solution through an ion exchange resin bed, said resin bed having a stronger affinity for iron ions than for magnesium ions;
(i) adding to said solution from said resin bed ammonium oxalate, thereby precipitating from solution magnesium oxalate;
(j) separating said precipitated magnesium oxalate from said solution; and
(k) calcining the magnesium oxalate at a temperature of 1000° C. for about 16 hours, thereby producing high purity magnesium oxide.

No references cited.

OSCAR R. VERTIZ, *Primary Examiner.*

G. T. OZAKI, *Assistant Examiner.*